(12) United States Patent
     Siegl

(10) Patent No.: US 11,046,481 B2
(45) Date of Patent: Jun. 29, 2021

(54) STAND SLEEVE FOR A PLASTIC CONTAINER CAPABLE OF WITHSTANDING INTERNAL PRESSURE

(71) Applicant: ALPLA Werke Alwin Lehner GmbH & Co. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 20 days.

(21) Appl. No.: 16/574,329

(22) Filed: Sep. 18, 2019

(65) Prior Publication Data

US 2020/0010241 A1    Jan. 9, 2020

Related U.S. Application Data

(63) Continuation of application No. PCT/EP2018/055389, filed on Mar. 6, 2018.

(30) Foreign Application Priority Data

Mar. 23, 2017   (CH) .................................... 00382/17

(51) Int. Cl.
    *B65D 23/00*     (2006.01)
    *B65D 83/38*     (2006.01)
    *F16M 13/00*     (2006.01)

(52) U.S. Cl.
    CPC ........... *B65D 23/001* (2013.01); *B65D 83/38* (2013.01); *F16M 13/005* (2013.01)

(58) Field of Classification Search
    CPC ...... B65D 25/22; B65D 25/24; B65D 23/001; B65D 83/388; B65D 83/38;
    (Continued)

(56) References Cited

U.S. PATENT DOCUMENTS

| 937,850 | A | * | 10/1909 | Parker | A47G 23/03 |
| | | | | | 81/3.09 |
| 3,229,949 | A | * | 1/1966 | Chaconas | F17C 13/086 |
| | | | | | 248/346.11 |

(Continued)

FOREIGN PATENT DOCUMENTS

| CN | 101784456 A | 7/2010 |
| CN | 201604857 U | 10/2010 |

(Continued)

OTHER PUBLICATIONS

Translation of JP05246435A, Yamada, Sep. 24, 1993, Paragraph 14 (Year: 1993).*

(Continued)

*Primary Examiner* — Robert J Hicks
(74) *Attorney, Agent, or Firm* — Buchanan Ingersoll & Rooney PC

(57) ABSTRACT

A stand sleeve for an inner-pressure-resistant plastic container, wherein the stand sleeve includes a base part having a stand surface, and a jacket which is closed in the peripheral direction, the base part and the jacket being configured as a single molded piece, and the jacket being configured for a non-positive connection to an outer wall in proximity of the base of an inner-pressure-resistant plastic container.

17 Claims, 3 Drawing Sheets

(58) Field of Classification Search
CPC ............ A47G 23/0316; A47G 23/0241; A47G 23/02; F16M 13/005
USPC .............. 248/346.01, 346.11, 149, 146, 127; 220/630, 634, 636, 628; 215/395, 376
See application file for complete search history.

(56) References Cited

U.S. PATENT DOCUMENTS

| | | | |
|---|---|---|---|
| 3,726,429 A | | 4/1973 | Doughty |
| 4,082,200 A | | 4/1978 | Guest et al. |
| 4,331,246 A | * | 5/1982 | Sorensen ............. B65D 23/001 215/372 |
| 4,367,820 A | * | 1/1983 | Yoshino ............... B65D 23/001 215/12.1 |
| 4,436,216 A | * | 3/1984 | Chang .................. B65D 23/001 215/376 |
| 4,609,418 A | | 9/1986 | Yoshino et al. |
| 4,961,701 A | * | 10/1990 | Barth ................... B65D 23/001 206/519 |
| 5,062,537 A | * | 11/1991 | Hayashi ............. B65D 23/0878 215/12.1 |
| 7,574,846 B2 | * | 8/2009 | Sheets .................. B65D 1/0261 198/803.8 |
| 8,439,223 B2 | | 5/2013 | Smith et al. |
| 2002/0027173 A1 | | 3/2002 | Polifka |
| 2009/0050599 A1 | * | 2/2009 | Martin ................. B65D 23/001 215/376 |
| 2009/0050638 A1 | | 2/2009 | Smith et al. |
| 2015/0352558 A1 | | 12/2015 | Lansell et al. |
| 2017/0327300 A1 | * | 11/2017 | Brouwer ............. B29C 65/1635 |
| 2017/0327302 A1 | * | 11/2017 | Brouwer ............... B65D 83/64 |
| 2019/0177041 A1 | * | 6/2019 | Walton .................. B65D 11/08 |

FOREIGN PATENT DOCUMENTS

| | | | | |
|---|---|---|---|---|
| CN | 202389777 U | 8/2012 | | |
| CN | 102814221 A | 12/2012 | | |
| CN | 203494602 U | 3/2014 | | |
| CN | 204674981 U | 9/2015 | | |
| CN | 106076562 A | 11/2016 | | |
| EP | 1126433 A1 | 8/2001 | | |
| JP | 05246435 A | * | 9/1993 | ........... B65D 23/001 |
| WO | WO-2007042484 A2 | * | 4/2007 | ............. B65D 41/62 |
| WO | 2012-102619 A2 | 8/2012 | | |
| WO | 2014053212 A1 | 4/2014 | | |

OTHER PUBLICATIONS

Translation of EP1126433, Bernard, Aug. 22, 2001, Fig. 3, Paragraph 25. (Year: 2001).*
International Search Report (PCT/ISA/210) dated May 11, 2018, by the European Patent Office as the International Searching Authority for International Application No. PCT/EP2018/055389.
Written Opinion (PCT/ISA/237) dated May 11, 2018, by the European Patent Office as the International Searching Authority for International Application No. PCT/EP2018/055389.
The Chinese Search Report dated Nov. 13, 2020, by the Chinese Patent Office in corresponding Chinese Application No. 2018800202832. (2 pages).
The Chinese Search Report dated Nov. 25, 2020, by the Chinese Patent Office in corresponding Chinese Application No. 2018800224954. (2 pages).
English Translation of the Chinese Search Report dated Nov. 13, 2020, by the Chinese Patent Office in corresponding Chinese Application No. 2018800202832. Previously filed on Feb. 8, 2021. (2 pages).
Office Action dated Mar. 17, 2021, by the European Patent Office in corresponding European Patent Application No. 18709536.9. (5 pages).

* cited by examiner

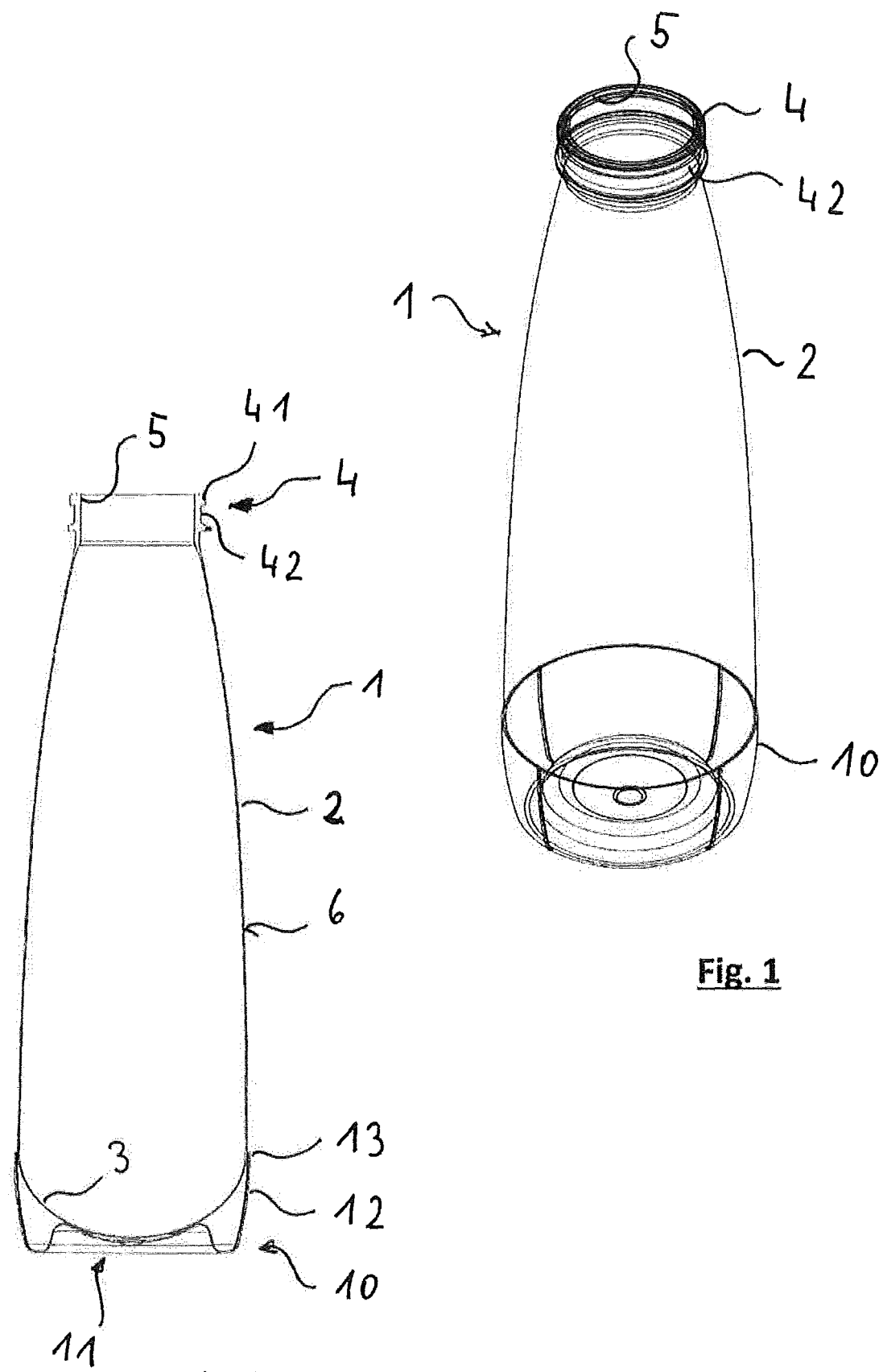

STAND SLEEVE FOR A PLASTIC CONTAINER CAPABLE OF WITHSTANDING INTERNAL PRESSURE

RELATED APPLICATION

This application claims priority as a continuation application under 35 U.S.C. § 120 to PCT/EP2018/055389, which was filed as an International Application on Mar. 6, 2018 designating the U.S., and which claims priority to Swiss Application 00382/17 filed in Switzerland on Mar. 23, 2017. The entire contents of these applications are hereby incorporated by reference in their entireties.

FIELD

The present disclosure relates to a stand sleeve for a plastic container capable of withstanding internal pressure, such as for a plastic aerosol container. The present disclosure also relates to an aerosol container which is provided with a stand sleeve.

BACKGROUND INFORMATION

Aerosol containers have been manufactured of metal, such as, of tin sheet or of aluminium. Aerosol containers of glass are occasionally found on the market. Herewith, one should particularly take into account the directive EC 75/324 of the European Community which is effective for such containers with a packaging size above 50 ml. Aerosol containers of metal have the disadvantage that they can corrode with time. Concerning metal containers, there is also a certain danger of surfaces with which they come into contact with being able to be scratched. On the other hand, aerosol containers of glass can break given incorrect handling, for example if dropped onto the ground.

For this reason, for some time now there has been an interest in designing aerosol containers as plastic containers. Several reasons favour the replacement of known metallic aerosol containers by aerosol containers of plastic. As a rule, the plastic containers are lighter than aerosol containers of metal, for example of tin or aluminium. The plastic containers are also manufacturable in a less expensive manner than aerosol containers of metal. Aerosol containers of plastic can also be designed for example in a transparent manner. However, the replacement of known aerosol containers of metal by those of plastic is not trivial, since aerosol containers as a rule need to withstand significantly higher inner pressures than is the case for example with plastic bottles for carbonated soft drinks. Whereas with soft drinks bottles, typically inner pressures of 2 bar to 4 bar are used, aerosol containers of plastic must withstand inner pressures of 5 bar to 15 bar at room temperature or, given heating, even inner pressures of up to 40 bar. Aerosol containers of plastic need to be chemically stable with regard to the applied propellant gas. In order for the base of the aerosol container to be able to withstand such increased pressures, this is arched convexly outwards in a dome-shaped manner. The shape of the container base is herein approximated as much as possible to that of a ball section for reasons of an improved pressure distribution. The convex container base however can no longer be placed upright on a level surface.

In order to permit an upright standing of the plastic aerosol container despite the convex container base, it has been suggested to provide the convexly designed container base with a stand sleeve. Such a stand sleeve is mostly designed in a beaker-like manner and includes a sleeve base and a cylindrical jacket. The stand sleeve is connected to the plastic aerosol container for example by way of bonding. The bonding of the stand sleeve to the aerosol container necessitates an additional working step on manufacturing an aerosol packaging. The bonding connection between the stand sleeve and the aerosol container renders to recycling of the aerosol container and of the stand sleeve after the empting of the aerosol container more difficult or event prevents this recycling.

For this reason, as an alternative, it has already been suggested to positively connect the stand sleeve and the aerosol container to one another. For this, the stand sleeve is provided with projections or the like, which engage into corresponding recesses or grooves on the aerosol container. The positive connection between the stand sleeve and the aerosol container demands a high precision on manufacturing the two components. Herein, the shrinkage on cooling the blow moulded plastic aerosol container must be taken into account just as the shrinkage on cooling the injection moulded stand sleeve. One can also take into account the fact that the aerosol container can expand to a certain degree under inner pressure, which can compromise the positive engagement of the projections into the recesses or grooves. Furthermore, it can be necessary to align the stand sleeve and the aerosol container to one another in an exact manner on assembly, for creating the positive connection. This renders the manufacture of the aerosol container with the stand sleeve more difficult and more expensive.

The stand sleeve is an injection moulded part which may not have a particularly high intrinsic stiffness. Should the aerosol container which is provided with the stand sleeve inadvertently drop to the ground then a deformation of the stand sleeve or even damage to it can occur, which can lead to this detaching from the aerosol container. However, the aerosol container can then no longer be placed in the upright position.

SUMMARY

A stand sleeve for an inner-pressure-resistant plastic container is disclosed, the stand sleeve comprising: a base part having a stand surface, and a jacket which is closed in the peripheral direction, the base part and the jacket being configured as a single moulded piece, and the jacket being configured for a non-positive connection to an outer wall in proximity of the base of an inner-pressure-resistant plastic container.

An aerosol container is also disclosed comprising: an inner-pressure-resistant plastic aerosol container, with a convexly outwardly projecting dome-shaped container base, and a stand sleeve for an inner-pressure-resistant plastic container, the stand sleeve including: a base part having a stand surface, and a jacket which is closed in the peripheral direction, the base part and the jacket being configured as a single moulded piece, and the jacket being configured for a non-positive connection to an outer wall in proximity of the base of the inner-pressure-resistant plastic container, wherein the stand sleeve is non-positively connected to an outer wall of the plastic container in a proximity of the base.

BRIEF DESCRIPTION OF THE DRAWINGS

Further advantages and features of the invention will be apparent from the subsequent description of exemplary embodiments with reference to the schematic drawings which are not true to scale, and wherein:

FIG. 1 shows a perspective view of an exemplary aerosol container with a transparently represented plastic container;

FIG. 2 shows an axially sectioned representation of the exemplary aerosol container according to FIG. 1;

DETAILED DESCRIPTION

Figure 3:
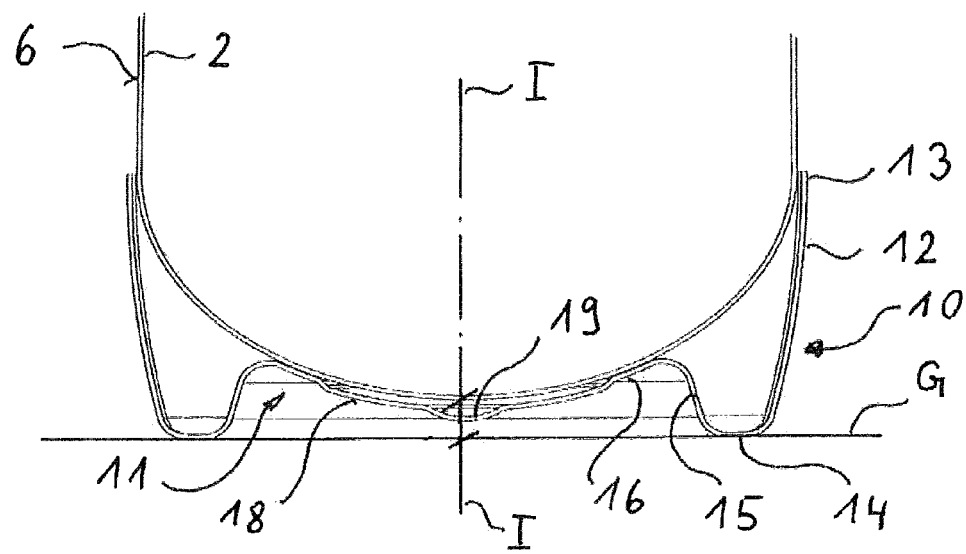
FIG. 3 shows an enlarged, axially sectioned representation of a section of the exemplary aerosol container which is close to the base.

To address disadvantages of known solutions, a stand sleeve is disclosed for an inner-pressure-resistant plastic container, the stand sleeve being simple to assemble and reliably sticking to the aerosol container.

An exemplary solution lies in a stand sleeve for an inner-pressure-resistant plastic container, such as for a plastic aerosol container.

A stand sleeve for an inner-pressure-resistant plastic container, such as for a plastic aerosol container can include a base part which includes a stand surface, and jacket which is closed in the peripheral direction. The base part and the jacket can be designed and configured together as one piece, such as a stretch blow moulded piece manufactured in a stretch blow moulding method. The jacket of the stand sleeve is designed and configured for a non-positive connection to an outer wall in the proximity of the base of the inner-pressure-resistant plastic container.

The stand sleeve can be designed and configured as a stretch blow moulded component in contrast to known injection moulded parts. The stand sleeve is biaxially stretched on stretch blow moulding. On account of this, can have a significantly larger strength, impact resistance and intrinsic stiffness than the known injection moulded stand sleeves. Whereas plastic injection moulding as a rule does not permit thin wall thickness due to the premature freezing, much thinner structures can be manufactured by stretch blow moulding.

For example, the ratio of flow length to wall thickness for recycling-capable polyethylene terephthalate (PET) is about 50 with plastic injection moulding, whereas ratios of larger than 150 can be realised in the stretch blow moulding method. Herewith, the wall thickness of a product which is manufactured in the stretch blow moulding method can be reduced by at least a factor of 3 compared to a product which is manufactured by injection moulding.

The danger of a deformation or even damage and a splinter formation which is entailed by this, on being dropped to the ground, is significantly reduced as a result of the high impact resistance of the stand sleeve. The danger of a stand sleeve which is assembled on an inner-pressure-resistant plastic container, in particular on a plastic aerosol container, detaching from the plastic container can be significantly reduced by way of this.

In contrast, the stand sleeve can be designed and configured in a manner such that when it is assembled on an inner-pressure-resistant plastic container, it can also survive an inadvertent drop to the ground. The stand sleeve is designed and configured for an adhesive-free and positive-fit free, purely non-positive connection to the plastic container, and on account of this is particularly easily accessible for recycling.

Due to the stand sleeve as disclosed being designed and configured for a non-positive connection to the plastic container, it can be designed and configured without engagement elements or the like. The stand sleeve can be simply and inexpensively manufactured by way of this. Likewise, the recesses or grooves, into which the engagement elements or the like on the jacket of the stand sleeve lock and which are necessary on the inner-pressure-resistant plastic container with known stand sleeves which can be assembled with a positive fit, can be done away with. The inner-pressure-resistant plastic container can be simply and inexpensively manufactured by way of this. The base part and the jacket of the stand sleeve are designed and configured together as one piece, by which means a separate assembly, for example a bonding of the two parts is done away with. Furthermore, the base part and the jacket include (e.g., can consist of) the same plastic material which can likewise represent an advantage for recycling.

In an exemplary embodiment variant, the stand sleeve can be a lost-neck mould piece manufactured by a lost-neck method. With regard to the lost-neck method, excess sections of a receptacle which is stretch blow moulded from a preform are removed for example by way of cutting, in order to obtain the stand sleeve. The lost-neck method provides the possibility of calibrating the sections of the jacket which can be important for the assembly of the stand sleeve, for example the end section of the jacket which is away from the base part, in order to ensure the dimensional accuracy which is desired for assembly. The excess sections can therefore be separated from the stand sleeve at an angle, so that a chamfer forms on the end part of the jacket, said chamfer simplifying the insertion of the inner-pressure-resistant plastic container into the stand sleeve.

An exemplary embodiment variant of the stand sleeve can include at least one stretch fold in the jacket, said stretch fold extending essentially in an axial direction. On account of the stretch fold, the jacket of the stand sleeve can adapt very well to the outer dimensions of the plastic container in the assembly region on assembly of the stand sleeve, and the jacket of the stand sleeve can follow any occurring extension of the plastic container which is due to the inner pressure, to a definable extent, in order to prevent an excessive pressure upon the outer wall of the plastic container in the assembly region. Herein, the stretch folds can be designed and configured in a manner such that they are practically not visible in the stretched state. Hereby, the stretch fold can extend over the complete height of the jacket or only over the part-region of the jacket which non-positively encompasses the base of the plastic container.

An exemplary embodiment variant of the stand sleeve can envisage the jacket having two or more stretch folds which are arranged at the same angular distance to one another. The individual stretch folds can be designed and configured more narrowly by way of the provision of several stretch folds. The larger number of stretch folds can permit a greater adaptation of the jacket of the stand sleeve to peripheral changes of the plastic container. The uniform distribution of the stretch folds over the periphery of the jacket can improve the adaption of the jacket to the plastic container in the assembly region and encourage a uniform pressure distribution over the periphery. However, the stretch folds can also be arranged at an unequal angular distance to one another. For example, two stretch folds can be arranged next to one another and a further two stretch folds which are arranged next to one another arranged at a predefined distance which is greater than the distance of the two stretch folds which are arranged next to one another.

A further exemplary embodiment variant of the stand sleeve can envisage the base part having a support region which extends inwards from the stand surface in the direction of extension of the jacket and which includes at least one concentrically arranged support surface. The support surface supports the container base in the assembled state and on assembly of the stand sleeve on the plastic container can serve as an assembly aid. The support surface can be designed and configured as a peripheral annulus or also only as segments or sectors, so that the container base is supported for example at only three points or at three part-regions. On assembly of the stand sleeve, the push-on length onto the plastic container is also predefined by the inwardly projecting support region, and the non-positive fit is limited by way of this.

For example, a part-region of the support region which connects the stand surface to the support surface can be designed and configured in an S-shaped manner, so that the support surface is reversibly elastically deformable relative to the stand surface. Longitudinal extensions due to temperature or pressure can therefore be compensated by way of this in the assembled state of the stand sleeve. Furthermore, a trough which is set back with respect to the outer wall of the container base can connect to the at least one support surface. Herewith, the resting contact of the container base upon the at least one support surface can be reduced.

In an exemplary embodiment variant of the stand sleeve, the base part includes an essentially centrally arranged recess. This recess can ensure that the stand sleeve does not come into contact with an injection point of the plastic container, said injection point as a rule projecting beyond the outer contour of the base. This recess can be arranged in the trough.

In an exemplary embodiment variant of the stand sleeve, the base part includes an essentially centrally arranged opening. The opening can serve for fluid or foreign bodies for example which get into the stand sleeve being able to exit from this again. For example, the fluid can run out of the plastic aerosol container down its outer wall and get into the stand sleeve. The opening can permit a flowing-away of the fluid.

In an exemplary embodiment of the stand sleeve, the stand sleeve, such as the jacket and the base part are free of openings. Herewith, the region of the inner-pressure-resistant plastic container which is encompassed by the stand sleeve can be protected from external and/or chemical influences from the outside, said influences able to lead to stresses in the container base.

By way of the stand sleeve including (e.g., consisting of) an orientated polymer composition in an exemplary embodiment, the stand sleeve can be manufacturable in the stretch blow moulding method to produce a stretch blow moulded stand sleeve with a very high intrinsic stiffness, impact resistance and high mechanical strength.

The polymer composition for the manufacture of the stand sleeve can include polymers whose main component, for example more than 70% by weight, for example, includes (e.g., consists of) at least one material from the group consisting of polyolefins, in particular polypropylene (PP), high density polyethylene (HDPE), low density polyethylene (LDPE), of polyesters, in particular polyethylene terephthalate (PET), polyethylene furanoate (PEF), polypropylene furanoate (PPF), polylactides (PLA), of styrene polymers, in particle styrene acrylic nitrile (SAN), general purpose polystyrene (GPS), high impact polystyrene (HIPS), of their copolymers and of mixtures of the mentioned polymers. The specified orientated polymers permit the desired characteristics of the stand sleeve to be set. They can be easily processed in the injection moulding method for manufacturing preforms and in the stretch blow moulding method, and permit an inexpensive manufacture of the stand sleeve with the desired high mechanical strengths. The stand sleeves can be designed and configured in a colouredly transparent, colouredly translucent or also colouredly opaque manner by way of the admixing of dyes.

A further exemplary embodiment variant of the stand sleeve can envisage this being designed and configured transparently at least in regions. The transparent design can permit a view onto the plastic container and its contents in the proximity of the base. The position of a riser tube can be examined by way of this, in order to be able to empty the plastic container as completely as possible, or also generally the filling level of the plastic container. Markings can also be arranged in the transparent region, if for example a pre-defined part-quantity is to be taken from the plastic container for example for special applications.

An exemplary aerosol container according to the disclosure can include an inner-pressure-resistant plastic container, such as a plastic aerosol container, with a convexly outwardly projecting dome-shaped container base and with a stand sleeve which is designed and configured according to the disclosure. The plastic aerosol container can be a plastic injection moulded part or be manufactured in a blow moulding process such as in a stretch blow mounding method or in an extrusion blow moulding method. The stand sleeve is non-positively connected to an outer wall of the plastic aerosol container in the proximity of the base of the plastic aerosol container.

As already mentioned, the stand sleeve can make do without complexly designed engagement elements or the like on account of the purely non-positive connection to the plastic aerosol container. Added to this is the fact that the plastic aerosol container can also be manufactured without corresponding deepenings, grooves or the like. This simplifies the manufacture of the stand sleeve as well as of the plastic aerosol container and renders the manufacture less expensive.

The purely non-positive connection between the stand sleeve and the plastic aerosol container also simplifies the assembly procedure, by way of one being able to forgo an exact alignment of the two components to one another. The non-positive connection can be adhesive-free, which can simplify a recycling of the emptied aerosol container. Here, the stand sleeve and the plastic container can be separated from one another and each component led to a recycling stream which is suitable for it. Furthermore, the stand sleeve and the plastic aerosol container can include the same plastic main component or be manufactured completely from the same plastic. The recycling is once again greatly simplified on account of this since the stand sleeve and the plastic container can be led to the same recycling stream.

In an exemplary embodiment of the aerosol container, the jacket of the stand sleeve at least in an end section which is away from the base part includes an inner diameter which is smaller than the inner diameter of the plastic aerosol container in a region close which is to the base and which is envisaged for the non-positive connection. A simple assembly of the stand sleeve on the plastic aerosol container is made possible due to the diameter difference, without the one or the other components having to be separately thermally treated for this. As a rule, a radial and axial expansion of the plastic container is effected due to the filling of the inner-pressure-resistant plastic container with a medium which is subjected to pressure, such as a propellant for aerosol applications. The non-positive fit between the stand sleeve and the plastic container can be enlarged by the expansion.

By way of a suitable design and configuration of the stretch fold or stretch folds in the stand sleeve, one succeeds in the stretch folds being almost extended given a maximal pressure within the plastic container and herewith the inner surfaces of the stretch folds bearing essentially on the outer wall of the plastic container. The stretch folds can also be designed and configured in a manner such that the stand sleeve produces essentially the same surface pressing upon the container base in the peripheral direction essentially independently of the radial extension of the plastic container and herewith independently of the pressure which prevails in the plastic container.

Due to the inner diameter of the end section of the stand sleeve being for example 0.2 mm to 6 mm smaller that the outer diameter of the plastic aerosol container in the region which is close to the base, in the pressure-less state and at 20° C. an adequately high non-positive fit which can also be resistant to drops can be achieved whilst taking into account the elasticity of the plastic material of the stand sleeve. For example, the non-positive fit between the two components can be examined by way of a standardised drop test, concerning which the filled plastic container with the assembled stand sleeve is cooled to for example −18° C. and from a 2 m height falls onto a hard underlay, for example, a stone slab, without being braked. Hereby, the stand sleeve is not to break at any impact angle upon the hard underlay.

The wall thickness can be shaped out very thinly due to the manufacture of the stand sleeve in the stretch blow moulding process. For example, the wall thickness of the stand sleeve is between 0.1 mm and about 0.7 mm. Given an impact, the wall of the stand sleeve can deform inwards in an elastic and/or plastic manner and hereby dissipate at least a large part of the impact energy. This dissipation can be assisted by the essentially parallel alignment of the polymer chain, which is achieved by the stretch blow moulding. A thick-walled injection moulded part with unordered polymer chains cannot dissipate the impact energy by deformation. In contrast, the impact energy is transferred in an almost uninhibited manner onto the plastic container. A protective function for the plastic container is essentially not achieved by an injection moulded stand sleeve.

With a further exemplary variant of the aerosol container, an outer wall in the region of the dome-shaped contained base can be supported by the support surface which projects away from the base part of the stand sleeve. The support surface can also serve as an assembly aid on assembly of the stand sleeve on the plastic container. Due to the inwardly projecting support surface, the push-on length onto the plastic container can be defined on assembly of the stand sleeve and the non-positive fit limited by way of this.

Concerning a further exemplary embodiment of the aerosol container, the outer wall of the dome-shaped container base which is supported by the support surface and the support surface in the support region of the stand sleeve can have essentially the same curvature. The container base can be supported as uniformly as possible by way of this, and local pressure load peaks of the container base can be avoided.

Concerning another exemplary embodiment variant of the aerosol container, the supported container base at its region which projects the furthest has a distance to a level stand surface which is for example roughly (e.g., ±10%) 1.5 to 5 mm, preferably roughly 1.8 mm to roughly 2.6 mm. A contact of the container base with alkaline fluids, for example with soap solution, as occurs for example on surfaces of sinks in bathrooms, can be avoided as a consequence of the distance of the container base to the stand surface. This can be of particular significance with stand sleeves which are provided with an opening in a central region of the base part. Alkaline fluids on contact with different plastic materials, such as in the base region can lead to stresses in the plastic material. It is indeed with plastic aerosol containers which can have a relatively high inner pressure that such a contact can be avoided by way of this.

The distance of the container base or the distance of the centre of the support region of the stand sleeve to the stand surface of the stand sleeve can also assist a standing on uneven ground, since the stand surface does not tilt about a support region which stands on a supporting surface. It is to be understood that the stand surface of the stand sleeve can be subdivided into part-surfaces, in order to permit a wobble-free standing even on an uneven supporting surface. The stand surface can be divided into two, three, four or also five part-regions which are separated from one another by way of recesses.

An aerosol container 1 which is represented in FIGS. 1 and 2 includes an inner-pressure-resistant plastic container 2, such as a plastic aerosol container, with a convexly outwardly projecting dome-shaped container base 3 as is particularly evident in FIG. 2, and a stand sleeve 10. The plastic aerosol container 2 can be an injection moulded part or be manufactured in a blow moulding process, for example in a stretch blow moulding method or in an extrusion blow moulding method. The plastic aerosol container can be designed and configured of one or more layers and include (e.g., consist of) for example at least 80% by weight of a plastic main component from the group containing (e.g., consisting of) polyethylene terephthalate, polyethylene furanoate, ppolylcactide, their copolymers and of mixtures of the mentioned plastics. For example, up to 20 percent by weight (% w/w) of foreign substances can be admixed to the plastic main component. For example, copolymers, dyes, UV blockers, stabilisation additives such as e.g. glass fibres or glass balls or mixtures thereof, additives or foreign polymers can be admixed to the plastic main component. The plastic main component can also yet include further plastics from the group consisting of PEN, PEF, PLA, polyester, polyamide, polybutylene terephthalate, polycarbonate, polyolefins, silicones, their copolymers and mixtures of the mentioned plastics.

The plastic aerosol container 2 can include a container neck 4 with an opening 5. The container neck 4 according to the represented exemplary embodiment includes a collar 41 which edges the opening 5 and is with an annularly peripheral groove 42 which is arranged below the collar 41. The collar 41 with the annularly peripheral groove 42 can simplify an assembly of a non-represented dispensing device, for example a valve unit, for an aerosol which is stored under pressure in the plastic aerosol container 2.

The plastic aerosol container 2 is mounted with its region which is close to the base in the stand sleeve 10 which, as is particularly evident in FIG. 2, includes a base part 11 and a jacket 12 which is designed and configured as one piece therewith. The stand sleeve 10 at least with its end region 13 which is away from the base part 11 is non-positively connected to an outer wall 6 of the plastic aerosol container 2 in a region of the plastic aerosol container 2 which is close to the base. The stand sleeve 10 can be designed and configured in a single-layered or multi-layered manner and is manufactured from an orientated polymer composition in a stretch blow moulding method.

The polymer composition for the manufacture of the stand sleeve can include polymers whose main component, for example more than 70% by weight, includes (e.g., consists of) at least one material from the group consisting of polyolefins, in particular polypropylene (PP), high density polyethylene (HDPE), low density polyethylene (LDPE), of polyesters, in particular polyethylene terephthalate (PET), polyethylene furanoate (PEF), polypropylene furanoate (PPF), polylactides (PLA), of styrene polymers, in particle styrene acrylic nitrile (SAN), general purpose polystyrene (GPS), high impact polystyrene (HIPS), of their copolymers and of mixtures of the mentioned polymers.

The plastic aerosol container 2 and/or the stand sleeve 10 can be designed and configured in a transparent, translucent or opaque manner. They can have the same colours or ones which are different to one another. The stand sleeve 10 and/or the plastic aerosol container 2 can further be designed transparently only in regions.

The sectioned exemplary representation in FIG. 3 shows the region of the plastic aerosol container 2 which is close to the base and which is received in the stand sleeve 10, in an enlarged scale. The base part of the stand sleeve 10 is again provided with the reference numeral 11; the jacket again has the reference numeral 12. The end region 13 of the jacket 12 which is away from the base part 11 is non-positively connected to the outer wall of the plastic aerosol container 2. FIG. 3 further shows that the base part 11 of the stand sleeve 10 includes a support region 15 which extends inwardly from a stand surface 14 of the base part 11 in the direction of the axial extension of the jacket 12 in an S-shaped manner. A concentrically arranged convex support surface 16 is formed there in the support region 15.

In the assembled state, the outer wall 6 of the container base 3 of the plastic aerosol container 2 lies on the support surface 16 and thus supports the container base 3. On assembly of the stand sleeve 10 on the plastic aerosol container 2, the support surface 16 limits the insert travel and can limit the magnitude of the non-positive fit by way of this. The support surface 16 is arranged concentrically about a middle axis I-I of the stand sleeve 10 and can consist of several part regions.

A trough 18 which is set back with respect to a contour of the container base 3 connects onto the support surface 16, so that in the assembled state the container base 3 or the outer wall 6 only lies on the support surface 16. The trough 18 can have a recess 19, in order to once again set back the trough 18 precisely in the centre of the container base 3, said recess able to have an injection point which projects with respect to the contour of the container base 3. The outer wall 6 of the dome-shaped container base 3 and the concentric, convex support surface 16 in the support region 15 of the stand sleeve 3 can have essentially the same curvature. The container base 3 can be supported as uniformly as possible by way of this.

In a further exemplary embodiment variant of the stand sleeve which is not represented, the base part can also have a roughly centrally arranged opening. This opening can serve for example for fluid or foreign bodies which get into the stand sleeve being able to exit from this again. For example, fluid can run out of the plastic aerosol container down its outer wall and get into the stand sleeve. The opening can permit a flowing-away of the fluid. As a rule, the stand sleeve is free of passages and/or openings.

The container base 3 which is supported in the stand sleeve 10 at its region which projects the furthest has a distance a to a level stand surface G which is for example 1.5 mm to 5 mm, preferably 1.8 mm to 2.6 mm.

The jacket 12 of the stand sleeve 10 can have an essentially cylindrical axial extension at its end region 13 which is away from the base part 11. The jacket 12 towards the base part 11 can have the shape of a key or a cone section each with a reducing outer diameter. In an alternative variant which is not represented, the jacket of the stand sleeve can also have a continuous cylindrical course with a constant diameter from the end region to the base part.

Figure 4:
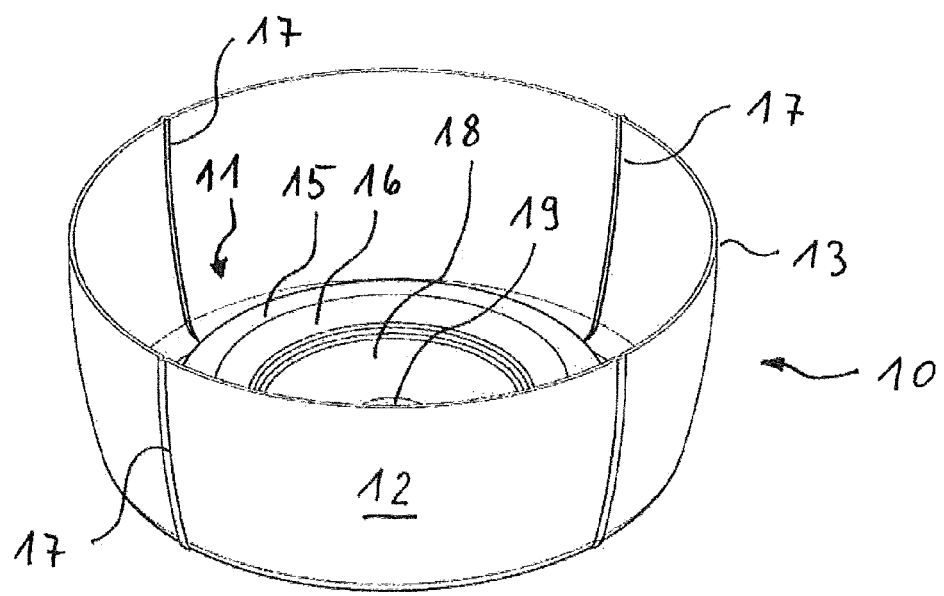
FIG. 4 shows a perspective representation of an exemplary stand sleeve.

FIG. 4 shows a perspective view of the stand sleeve 10 according to FIG. 3 with a view to its inside. The bowl-like jacket has the reference numeral 12. The base part is again provided with the preference numeral 11. The support region 15 projects with the concavely designed support surface 16 away from the base part 11 into the inside of the stand sleeve 10.

The jacket 12 of the stand sleeve 10 has a predefined number, in the present embodiment example four, of stretch folds 17 which extend essentially in an axial direction and are arranged at the same angular distance to one another. The jacket 12 of the stand sleeve 10 can be very well adapted and configured to the outer dimensions of the plastic aerosol container in the assembly region due to the stretch folds 17.

The stretch folds 17 also permit the jacket 12 of the stand sleeve 10 to be able to follow any expansion of the plastic aerosol container as a result of the inner pressure, in order to prevent an excessive pressure upon the outer wall of the plastic container in the assembly region. The stretch folds can be designed and configured in a manner such that they are practically not visible in the stretched state. In the present exemplary embodiment, the stretch folds extend over the complete height of the jacket 12. In a further exemplary embodiment which is not represented, the stretch folds 17 extend only over the height, in which the container base is non-positively peripherally encompassed.

Figure 5:
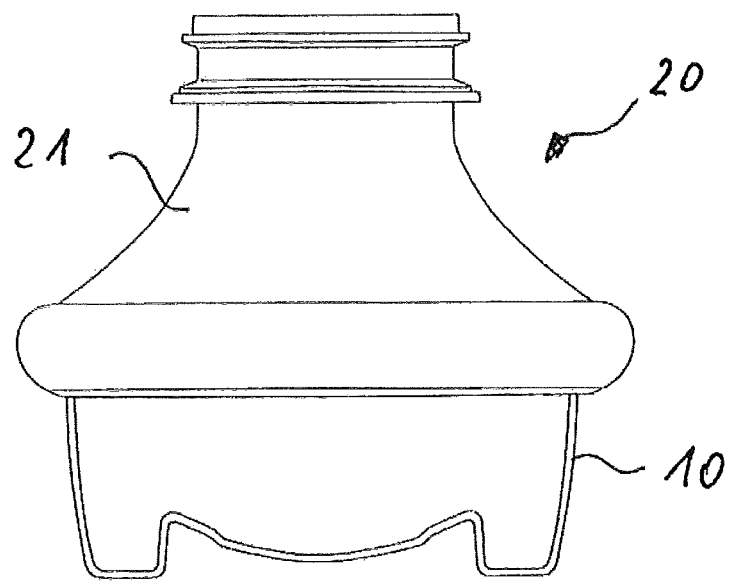
FIG. 5 and FIG. 6 show two schematic representations for explaining the exemplary manufacturing methods of the stand sleeve in a lost-neck method.
Figure 6:
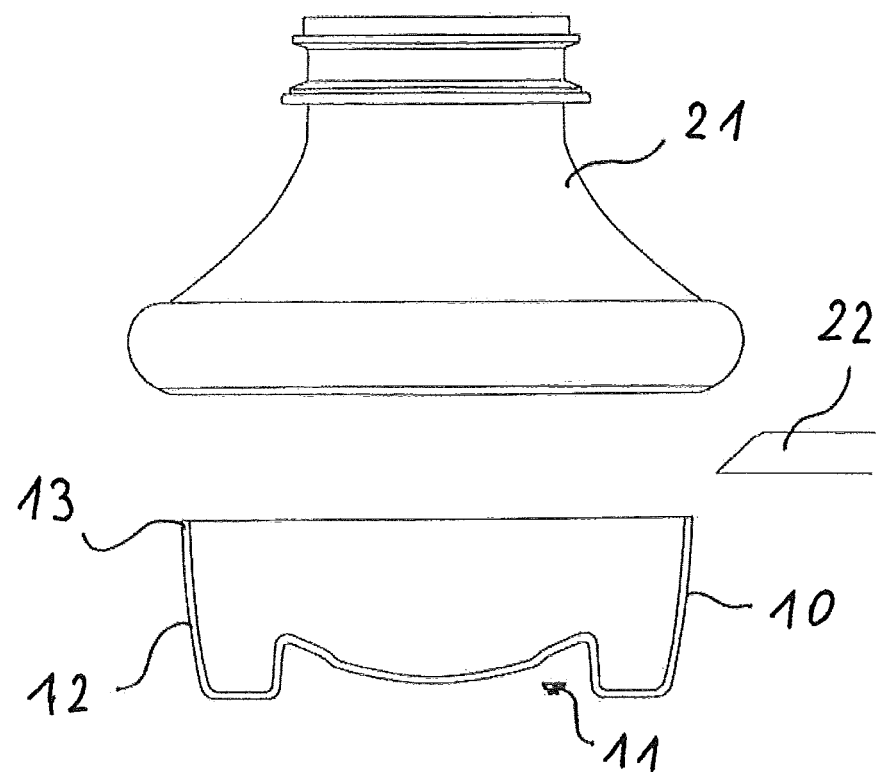

The drawings FIG. 5 and FIG. 6 serve for explaining exemplary manufacture of the stand sleeve 10.

FIG. 5 shows an intermediate container 20 which is manufactured in a stretch blow moulding method from a preform which is for example manufactured in an injection moulding method. Herein, in particular preforms which are designed and configured in a relatively short manner with respect to their diameter can be used. For example, such preforms have a total length of 15 mm to 150 mm.

The manufacture of the stand sleeve 10 is effected for example in the so-called lost-neck method. With regard to this method, an excess part of the intermediate container 20 which is also called a spire 21 is separated away with a cutting or punching tool 22, as is illustrated in FIG. 6. The separated spire 21 can be recycled. The remaining section of the intermediate container forms the stand sleeve 10. The manufacture of the stand sleeve 10 in the lost-neck method provides the possibility of calibrating the sections of the jacket 12 which can be important for the assembly of the stand sleeve 10, such as the end section 13 of the jacket 12 which is away from the base part 11, in order to ensure the dimensional accuracy which can be necessary for the assembly. The cut can also be effected at a predefined angle to the middle axis, so that the end region 13 of the jacket 12 has an insert chamfer which simplifies the insertion of the plastic aerosol container into the jacket 10.

The aforementioned description merely serves for the explanation of exemplary embodiments and is not to be considered as limiting.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A stand sleeve for an inner-pressure-resistant plastic container, said stand sleeve comprising: a base part having a stand surface, and a jacket which is closed in the peripheral direction, the base part and the jacket being configured as a single moulded piece, and the jacket being configured for a non-positive connection to an outer wall in proximity of the base of an inner-pressure-resistant plastic container wherein the jacket comprises:
   at least one stretch fold which extends essentially in an axial direction.

2. A stand sleeve according to claim 1, wherein the single moulded piece is a stretch blow-moulded piece with lost-neck shaping.

3. A stand sleeve according to claim 1, wherein the jacket comprises:
   two or more stretch folds arranged at a same angular distance to one another.

4. A stand sleeve according to claim 3, wherein the base part comprises:
   a support region which extends inwards from the stand surface and which has at least one concentrically arranged support surface.

5. A stand sleeve according to claim 4, wherein the base part comprises:
   a roughly centrally arranged recess.

6. A stand sleeve according to claim 5, formed of a material which consists of an orientated polymer composition.

7. A stand sleeve according to claim 6, wherein the material consists of polymers whose main component, by more than 70% by weight, consists of at least one material from the group consisting of polyolefins, polypropylene (PP), high density polyethylene (HDPE), low density polyethylene (LDPE), of polyesters, polyethylene terephthalate (PET), polyethylene furanoate (PEF), polypropylene furanoate (PPF), polylactides (PLA), of styrene polymers, styrene acrylic nitrile (SAN), general purpose polystyrene (GPS), high impact polystyrene (HIPS), of their copolymers and of mixtures of the mentioned polymers.

8. A stand sleeve according to claim 6, comprising:
   transparent regions.

9. A stand sleeve according to claim 1, wherein the base part comprises:
   a support region which extends inwards from the stand surface and which has at least one concentrically arranged support surface.

10. A stand sleeve according to claim 1, wherein the base part comprises:
    a roughly centrally arranged recess.

11. A stand sleeve according to claim 1, formed of a material which consists of an orientated polymer composition.

12. A stand sleeve according to claim 1, comprising:
    transparent regions.

13. An aerosol container comprising:
    an inner-pressure-resistant plastic aerosol container, with a convexly outwardly projecting dome-shaped container base, and a stand sleeve for the inner-pressure-resistant plastic container, the stand sleeve including:
    a base part having a stand surface, and a jacket which is closed in the peripheral direction, the base part and the jacket being configured as a single moulded piece, and the jacket being configured for a non-positive connection to an outer wall in proximity of the base of the inner-pressure-resistant plastic container, wherein the stand sleeve is non-positively connected to an outer wall of the plastic container in a proximity of the base, wherein the jacket of the stand sleeve, at least in an end section which is away from the base part, has an inner diameter which is smaller than an outer diameter of the plastic aerosol container in a region which is close to the base and which is envisaged for the non-positive connection, and wherein the inner diameter of the end section of the stand sleeve is 0.2 mm to 6 mm smaller than the outer diameter of the plastic aerosol container in the region which is close to the base, given a pressure-less state and at 20° C.

14. An aerosol container according to claim 13, wherein the outer wall of the stand sleeve is supported by the support surface in the region of the dome-shaped container base.

15. An aerosol container according to claim 14, wherein the outer wall which is supported by the support surface and the support surface essentially have a same curvature.

16. An aerosol container according to claim 15, wherein the supported container base at its region which projects furthest has a distance (a) to a level stand surface (G) which is roughly 1.5 mm to roughly 5 mm.

17. An aerosol container according to claim 15, wherein the supported container base at its region which projects the furthest has a distance (a) to a level stand surface (G) which is roughly 1.8 mm to roughly 2.6 mm.

* * * * *